UNITED STATES PATENT OFFICE.

PAUL THOMASCHEWSKI, OF OPLADEN, NEAR COLOGNE, GERMANY, ASSIGNOR TO SYNTHETIC PATENTS CO., INC., OF NEW YORK, N. Y., A CORPORATION OF NEW YORK.

UREA AND THIOUREA COMPOUNDS.

1,218,656.  Specification of Letters Patent.  Patented Mar. 13, 1917.

No Drawing.  Application filed June 26, 1915. Serial No. 36,485.

*To all whom it may concern:*

Be it known that I, PAUL THOMASCHEWSKI, doctor of philosophy, chemist, citizen of the German Empire, residing at Opladen, near Cologne, Germany, have invented new and useful Improvements in Urea and Thiourea Compounds, of which the following is a specification.

The present invention relates to the manufacture and production of new and valuable derivatives of diaminodiarylsulfonic acids. The process for their production consists in treating diaminodiarylsulfonic acids, *e. g.*, benzidin-sulfonic acids, tolidin-meta- and ortho-disulfonic acid, benzidin-polysulfonic acid (obtained by treating the benzidin-meta-disulfonic acid with fuming sulfuric acid), the sulfonic acids of diphenylin, etc., with phosgen or thiophosgen or other products suitable for introduction of the —CO— or —CS— group, such as bisulfid of carbon.

By this process two or more molecules of a diaminodiarylsulfonic acid are linked together by the —CO— or —CS— group, new ureas and thioureas being obtained characterized by containing in their molecule the group —NH—A—NH—R—NH—, in which A stands for a radical of a diarylsulfonic acid which may contain other substituting groups, such as methyl; R stand for —CO—, the residue of the carboxyl group or —CS—, the residue of the thiocarboxyl group. Of course two or more different diaminodiaryl sulfonic acids can thus be linked together by the —CO— and —CS— group.

If, as above stated, three, four or still more molecules of the diaminodiarylsulfonic acids are linked together by the acid radical products result having *e. g.* the following general formula:

—NH—A—NH—R—NH—A—NH—R—NH—A—NH— and

—NH—A—NH—R—NH—A—NH—R—NH—A—NH—R—NH—A—NH— etc., wherein A and R have the above given meaning. In such a formula A can stand also for different diaminodiaryl sulfonic acids and R for —CO— and —CS— in one compound.

The new products are in the shape of their alkali-metal salts whitish powders soluble in hot water. The free acids possess the remarkable property that they precipitate glue from its aqueous solution. They also possess therapeutic value, as they show strong blood-parasite-destroying qualities and comparatively small injurious effect toward the host.

In order to illustrate the new process more fully the following example is given, the parts being by weight:—50 parts of benzidin-meta-disulfonic acid having the formula:

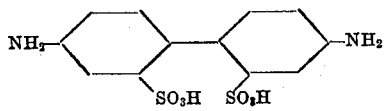

are dissolved in 2000 parts of water together with the necessary quantity of soda. At a temperature of 30° C. during 12–16 hours a slow current of phosgen is introduced while taking care that the mixture of the reaction be always alkaline. The viscoid liquid is then acidulated with strong hydrochloric acid. The product of the reaction thus precipitated is an amorphous whitish substance furnishing a thick colloid solution with water. Its sodium salt is soluble in water. Even very dilute solutions of the acid make spirochætæ disappear from the blood of animals infected with them.

Although I have above described an example by which my new products may be obtained, neverthless I do not wish to be understood as thereby excluding equivalents for the ingredients, or the operations employed in the process, which may be employed without departing from the scope of the invention intended to be secured hereby.

I claim:—

1. As new products ureids and thioureids of diaminodiarylsulfonic acids characterized by containing in their molecule the general group —NH—A—NH—R—NH— in which A stands for the radical of a diarylsulfonic acid and R for —CO— or —CS—, which products precipitate glue from its aqueous solution, being in the shape of their alkali-metal salts whitish powders soluble in hot water; and showing strong-blood-parasitedestroying qualities, substantially as described.

2. As new products, ureids and thioureids of diaminodiarylsulfonic acids characterized by containing in their molecule a plurality of groups having the general formula —NH—A—NH—, in which A stands for the radical of a diarylsulfonic acid, connected together by —CO— or —CS— groups, which products are, in the form of their alkali-metal salts, soluble in hot water, substantially as described.

3. As new products, ureids and thioureids of diaminodiarylpolysulfonic acids characterized by containing in their molecule a plurality of groups having the general formula —NH—A—NH—, in which A stands for the radical of a diarylpolysulfonic acid, connected together by —CO— or —CS— groups, which products are, in the form of their alkali-metal salts, soluble in hot water, substantially as described.

4. As new products ureids of diaminodiarylsulfonic acids characterized by containing in their molecule the general group: —NH—A—NH—CO—NH— in which A stands for the radical of a diarylsulfonic acid, which products precipitate glue from its aqueous solution; being in the shape of their alkali-metal salts whitish powders soluble in hot water; and showing strong-blood-parasite-destroying qualities, substantially as described.

5. As new products ureids of diaminodiarylsulfonic acids characterized by containing in their molecule the general group: —NH—A—NH—CO—NH—, in which A stands for the radical of a diarylpolysulfonic acid of the benzene series, which products precipitate glue from its aqueous solution; being in the shape of their alkali-metal salts whitish powders soluble in water; and showing strong-blood-parasite-destroying qualities, substantially as described.

6. As a new product the ureid being obtained from benzidin-meta-disulfonic acid and phosgen characterized by containing in its molecule the group:

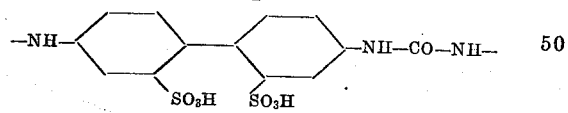

which product is an amorphous whitish substance furnishing a thick colloid solution with water; its sodium salt being soluble in water; and showing a strongly spirochæta-destroying action, substantially as described.

In testimony whereof I have hereunto set my hand in the presence of two subscribing witnesses.

PAUL THOMASCHEWSKI. [L. S.]

Witnesses:
  HELEN NUFER,
  ALBERT NUFER.